(12) United States Patent
Willey

(10) Patent No.: US 6,484,914 B1
(45) Date of Patent: Nov. 26, 2002

(54) MOTORCYCLE ACCESSORY MOUNTING SYSTEM

(76) Inventor: Barry A. Willey, 2200 Maywood Dr., Maywood, IL (US) 60153

( * ) Notice: Subject to any disclaimer, the term of this patent is extended or adjusted under 35 U.S.C. 154(b) by 0 days.

(21) Appl. No.: 09/932,616

(22) Filed: Aug. 17, 2001

(51) Int. Cl.[7] .................................................. B62J 7/00
(52) U.S. Cl. ....................... 224/413; 224/415; 224/418; 224/419; 224/423; 224/427
(58) Field of Search ................... 224/413, 415, 224/418, 419, 423, 427, 440, 441, 443, 447, 450; 280/288.4; 297/195.1

(56) References Cited

U.S. PATENT DOCUMENTS

| | | | |
|---|---|---|---|
| 4,466,660 A | * | 8/1984 | Mabie ........................ 224/413 |
| 5,558,260 A | | 9/1996 | Reichert |
| 5,658,035 A | | 8/1997 | Armstrong |
| 5,725,138 A | * | 3/1998 | Zagrodnik ................... 224/413 |
| 5,732,965 A | | 3/1998 | Willey |
| 5,845,955 A | | 12/1998 | Willey |
| 6,254,166 B1 | | 7/2001 | Willey |
| 6,390,220 B1 | * | 5/2002 | Galbraith et al. ........... 180/219 |

* cited by examiner

*Primary Examiner*—Stephen K. Cronin
*Assistant Examiner*—Maerena W. Brevard
(74) *Attorney, Agent, or Firm*—Vedder Price Kaufman & Kammholz

(57) ABSTRACT

A system for mounting and removing an accessory from a motorcycle. The mounting system includes a main frame and two latching frames. The latching frames each include a latching claw biased closed by spring means. The latching frames are secured to the main frame by pivot pins. Each latching frame preferably includes a finger engaging flange, while the latching frames also include tabs cooperating with retaining arms attached to lock assemblies.

20 Claims, 3 Drawing Sheets

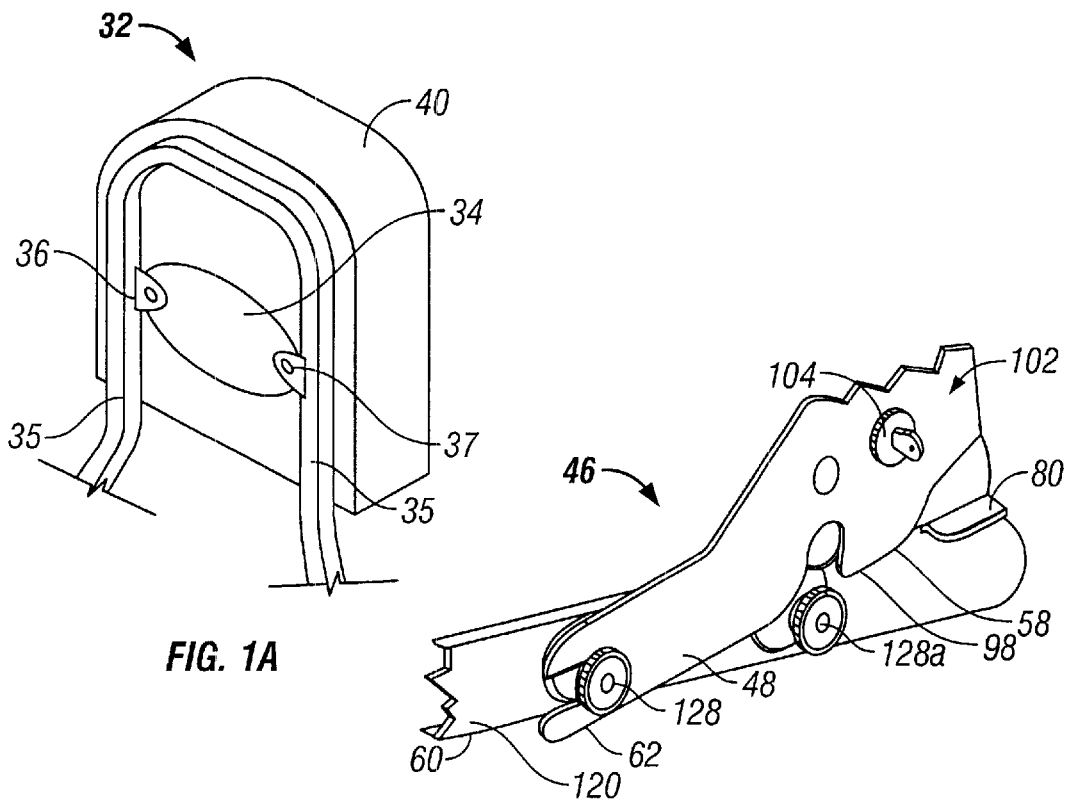
FIG. 1A
FIG. 2
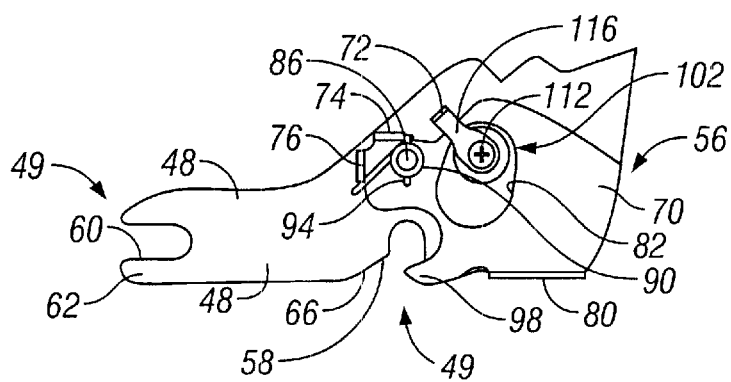
FIG. 3
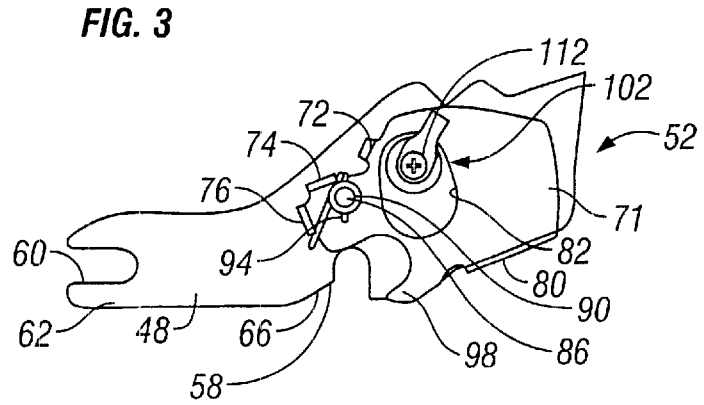
FIG. 4

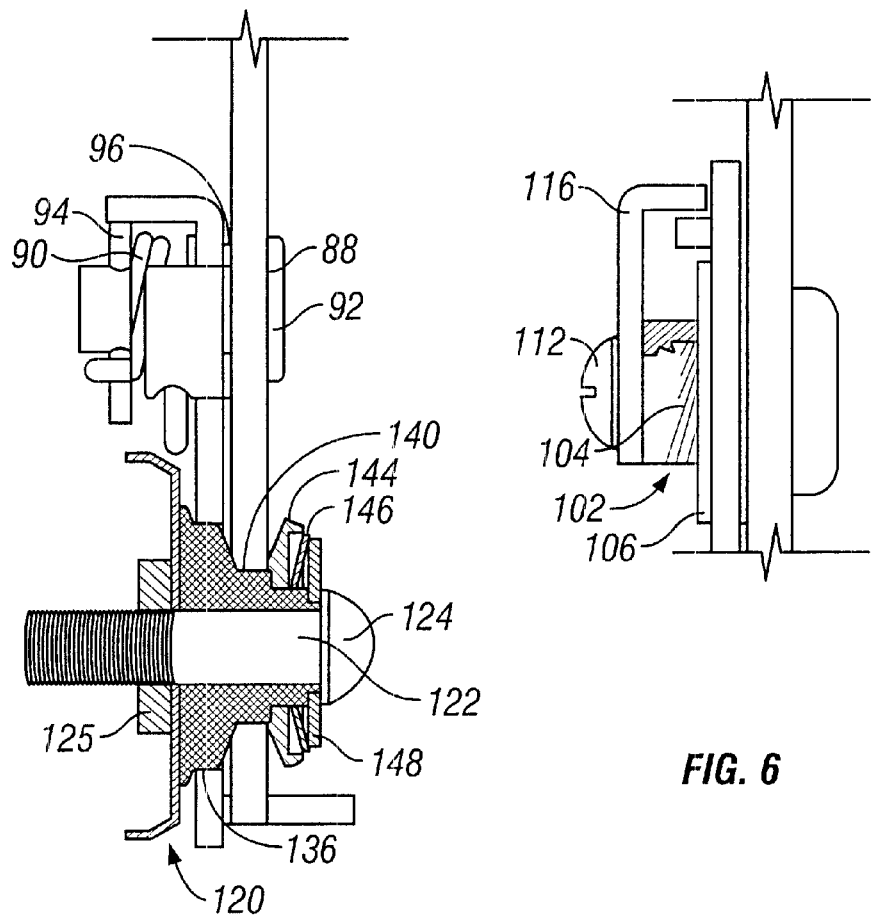
FIG. 5
FIG. 6
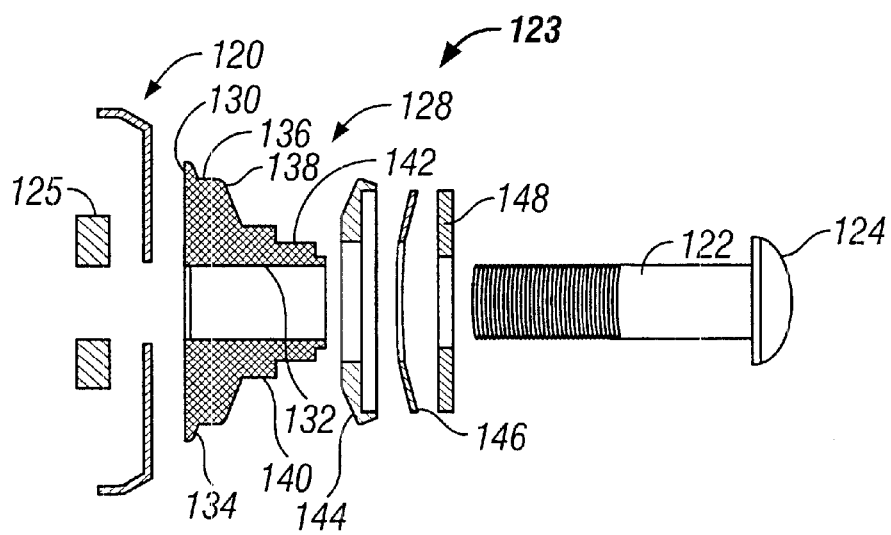
FIG. 7

MOTORCYCLE ACCESSORY MOUNTING SYSTEM

BACKGROUND OF THE INVENTION

The present invention relates generally to motorcycle accessories, and more particularly to a specialized combination of back rest or sissy bar and luggage rack having a novel mounting system. While these units generally have been known for some time, they have heretofore lacked several features which makes them attractive and susceptible of widespread use for motorcycles.

Particularly, the present invention relates to combination back rest and luggage rack limits that are adapted to fit and be retained securely on, and easily released and taken off, from cruiser-type motorcycles. Although the accessories of the present invention can be used with sport cycles or the like, most sport cycles do not have the structural mounting portions needed for easy attachment.

The typical cruiser-type motorcycle generally embodies a low seat, with the rider's legs moved forward, and the handlebars either upright or almost so. The passenger seat is also a low seat, but with the passenger's normal posture either being straight up or slightly leaning back. This means the passengers must hold onto the rider for support, or lean back and be supported on a back rest of some sort. Consequently, the successful cruiser accessory is one wherein a so-called sissy bar is in use, or more properly, where a back rest may be brought into play, preferably a back rest with a good sized pad on the same.

Another aspect of the invention is that besides the back rest, an integrated luggage rack is provided, preferably a rack that includes a flat cargo area, has one or more cross-members in its frame and preferably has a plurality of eyes adapted to receive hooks for fastening the load. Such hooks are generally attached to or form a part of an elastomeric cords that can be stretched over a variety of loads, ranging from a backpack or sleeping bag or the like, to lightweight items such as clothing articles which may be temporarily placed on and taken off from the luggage rack.

With prior art designs intended to accomplish this purpose, there have been a number of drawbacks. First, the combination back rest and luggage rack unit has not always been secure and rattle-free in its installation, and able to accommodate manufacturing tolerances applicable to the cycle and to the accessory. Such units often require loosening and tightening once they were in place. This is very inconvenient.

Moreover, a simple accessory would be one which is a readily installable and releasable, and may conveniently be taken on and off the cycle with a minimum of difficulty.

Still further, an advantageous construction would be a unit which is able to provide a latch which is simple but reliable in use, and which contains a minimum practical number of working parts, yet is foolproof. Preferably, the combination unit would include a construction which may be removed by simply pushing on a pair of finger flanges, while positioning the remainder of the hands to remove the device in one motion.

Prior art devices have had somewhat reliable latches, but such units were often not easy to access, and were very difficult to remove in a simple operation. Often, such units required the heads to move in opposite directions. Such units included a separate latching mechanism which was not integrated with the installation and removal system, thereby creating significant difficulty or requiring great dexterity in use.

Consequently, it is an object of the invention to provide an improved back rest/sissy bar and luggage rack or other combination accessory of an improved design.

Another object of the invention is to provide a luggage rack and back rest which are integrated in use and which are adapted to provide maximum utility at reasonable cost.

A still further object of the invention is to provide a combination back rest and luggage rack which includes a main frame having two slots on each side, which slots are readily adaptable for receipt and latching merely by pushing over pairs of mounting lugs on each side of the cycle.

A still further object of the invention is to provide a main accessory frame which includes on each side a latching frame which pivots in place and is adapted to enable the latch frame to swing into place when biased by a captive spring, and which will then remain latched in place.

A still further object is to provide a latching system which employs a retaining arm which is contoured so as to overlie a latching tab in the latched position, thereby preventing any movement of the latch frame when the retaining arm is so positioned.

Another object of the invention is to provide a latching frame which includes an opening to accommodate a pivot pin, an opening for receiving the lock assembly, with various tabs adapted to limit the movement of the latching frame and provide a spring base and a stop for a roll pin or like unit.

A still further object is to provide an accessory having two main frame elements and two latching frames, each with a plurality of tabs, each adapted for its own use, including finger-engaging flanges for simultaneously unlatching and releasing both sides of the unit simultaneously.

Another object is to provide a device wherein the principal frame may be bolted together, thereby allowing certain variations in manufacturing, so that other back rests, luggage racks or the like in various styles may be substituted without affecting the latching and locking mechanism.

These and other objects of the invention, including those that are inherent therein, are accomplished by providing a pair of main frame components including a lock and a pair of latching frames, with the latching frames being pivotally attached to the main frame, and having a finger-engaging flange, an opening in the latch frame, a claw for releasably securing the frame to a structural member and tabs for engaging springs that urge the latch formed by the claw to a closed position.

The exact manner in which these and other objects of the invention are achieved in practice will become more apparent when reference is had to the following description of the preferred embodiment of the invention and shown in the accompanying drawings in which like reference numerals indicate corresponding parts throughout.

BRIEF DESCRIPTION OF THE DRAWINGS

FIG. 1A is a fragmenting perspective view of the rear of the latch rest;

FIG. 2 is a fragmentary side elevational view of the mounting bracket and the accessory of the invention in position with the front slot mounting engaged with one mounting bracket and the rear mounting slot raised upwardly of the other mounting bracket;

FIG. 3 is a fragmentary side elevational view, taken from the inside surface of the accessory and showing the latch frame positioned holding the accessory in place and with the latch in the secured position.

FIG. 4 is a view similar to FIG. 3, but showing the latch frame in the retracted position;

FIG. 5 is a greatly enlarged, vertical sectional view taken along lines 5—5 of FIG. 3, and showing the ferrule and associated parts for attaching the accessory to the cycle and showing portions of the principal frame, the latch frame, and the manner in which they cooperate with the ferrule when the ferrule is attached to the cycle;

FIG. 6 is greatly enlarged vertical sectional view, taken along lines 6—6 of FIG. 3 and showing the locking mechanism, of the invention, including the retaining arm fitting over the locking tab; and FIG. 7 is an exploded view of the ferrule and associated parts shown in FIG. 5.

DESCRIPTION OF THE PREFERRED EMBODIMENTS OF THE INVENTION

Figure 1:
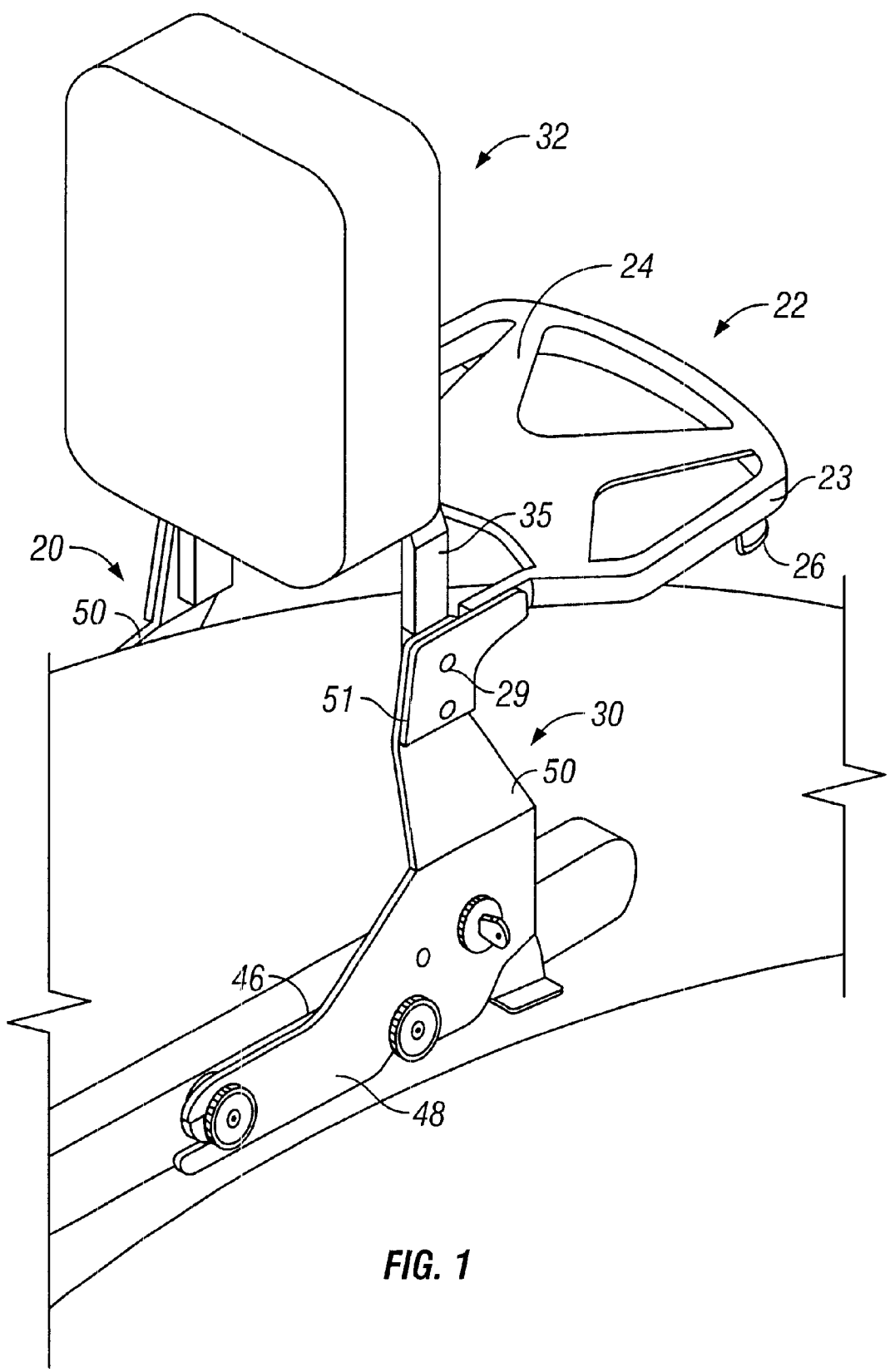
FIG. 1 is a perspective view, with portions broken away, of the motorcycle accessory of the invention, showing the same in position of use over a motorcycle fender mounting bracket with which it is typically associated in use.

While the present invention may be embodied in several different forms and may comprise elements different from or other than those set forth and described in detail herein, a particular embodiment will be described wherein the application is a so-called cruiser-type motorcycle in which the elements are generally as described.

Thus, referring now to the drawings in greater detail, there is shown in FIG. 1 a combination luggage rack and back rest or "sissy bar" unit 20. This unit 20 includes a luggage rack component generally designated 22, having a perimeter frame 23 and which preferably encloses a decorative flat plate 24 for supporting luggage or a luggage-type load.

There are at least two hold-down eyes 26 which cooperate with hooks (not shown) on elastic cords holding the luggage to the luggage rack 22. In addition, there are fasteners 28 which secure the frame 23 of the luggage rack to the principal frame generally designated 30, and these fasteners 28 extend through the end portions respectively, of the principal frame 30 and the perimeter frame 23.

Another element of the combination accessory is a back rest or so-called "sissy bar" component generally designated 32, which may include a decorative medallion 34 (FIG. 1A) extending between sections of the back rest frame 35 and a plurality of short tabs 36 which accommodate pad fasteners 38. The pad fasteners are used to secure a back rest pad 40 to the back rest frame 35. There are also fasteners which secure the frame 35 of the back rest 32 or so-called "sissy bar" to the principal frame 30 and the outside frame 23. These fasteners may be the same as those fasteners 28 which hold the other elements together, or may be employed separately if the maker desires.

A principal feature of the invention is the attachment system generally designated 46 for attaching the principal frame generally designated 30 to the appropriate portions of the motorcycle. The attachment system of the combination unit 20 is comprised of the lower portion 48 of the principal frame 30, which in turn includes two upper, offsetting portions 50, and two top sections 51, through which extend the fasteners 28 for securing the perimeter frame 23 to the back rest frame 35.

The lower part 48 of the principal frame 30 includes two each post-receiving members generally designated 49. In addition, there is a latching frame component generally designated 56, which is pivotally attached to the principal frame 30. The lower part 48 of the principal frame 30 has portions on each of its sides which include a generally horizontally extending front slot 60 located in the nose portion 62 of the frame. The rear portion of the lower part 48 of the principal frame includes a vertical or nearly vertical slot 58 and an inclined slot entrance 66. There may be additional guide surfaces, if desired.

The latching frame 56 referred to above, includes a generally planar body portion 70, a locking tab 72 to prevent removal of the unit in combination with a latch to be described later, a stop tab 74 for a roll pin or the like whose function will be described below, and a spring stop tab 76.

Another component in the form of invention shown is the generally oval-shaped opening 82 in the body 70 of the latching frame 56, and at the lower end of each latching frame 56 is another component, namely, a finger-engaging flange 80.

The latching frame 56 is pivotally attached to the main frame 48 by a pivot pin 86, which extends through a pin-receiving opening 88. The pin includes a headed or enlarged end portion 92. The pivot pin 86, besides locating the latching frame 56, includes a spring 90 wound around the pivot pin, and the spring 90 is held in place at one end by a spring holder in the form of a roll pin 94 extending through the pivot pin 86, with the other end being held by the spring stop tab 76. A thin, flat Delrin or like lubricous washer 98 separates the latching frame from the main frame to provide an easy pivoting action between the two.

The latching frame importantly also includes a latching claw 98 which enables the lower portion 48 of the frame 30 to be releasably secured to the rear ferrule 128a. The movement of this latching claw 98 is controlled by the finger-engaging flange 80, as the latching frame 56 as a whole pivots about the pin 86.

The oval-shaped opening 82 in the latching frame 56 cooperates with a lock assembly generally designated 102 and other components to be described. The lock assembly generally designated 102 includes a lock cylinder 104 having threads on its outer surface which is held in place by a locking nut 106 screwed over its exterior surface. The moveable cylinder element of the lock is rotatable within the outside lock cylinder 104. These parts cooperate with a locating screw 112. Movement is limited by an indexing washer and a retaining arm 116 is held in place by the locating screw 112. These parts cooperate with the locking tab 72 to ensure that when the retaining arm is in place over the locking tab 72, the latching frame 56 cannot move, at least more than a few thousandths of an inch.

Another chief component which is used with the accessory is an element which may assume any one of several forms, but is a ferrule basically attached to a structural mounting member (FIGS. 5 and 7) generally designated 120. This fitting system includes a generally longitudinally extending shank member 122 which includes an enlarged portion 124 on one of its ends, or in the middle, depending on the application, with the other end receiving a nut 125 to hold the shank in a fixed position relating to the structural mounting member 120.

The preferred mounting member uses a contoured ferrule generally designated 128 having respectively a rear flat surface 130, a central bore 132 to accommodate the shank, a first, tapered lead-in surface 134, a first, outermost latch frame-receiving cylindrical surface 136, a second lead-in surface 138 and a second cylindrical surface 140.

This fitting or ferrule 128 also contains a third cylindrical surface 142 for receiving a take-up fitting 144, an axial spring washer, preferably of the belleville type 146 and a head engaging flat washer 148.

Assuming now that the motorcycle has the attaching system 123 including the ferrule 128 and associated parts in position on the structural mounting member 120, the accessory unit 20 is ready for installation on the motorcycle.

First, the unit is positioned so that the slot 60 in the nose portion 62 slips inside the enlarged portion 124 on the shank member 122, engaging the ferrule 128 and associated parts. Once the front slot 60 is engaged, the rear slot 58 then engages the rear ferrule assembly 128a located on the structural member 120.

When the lower frame portion 48 is moved into position adjacent the ferrule 128a, the finger-engaging flange 80 is preferably pushed upwardly, thereby pulling the latching claw 98 away from its position partially covering the slot 58. A simple downward movement until the slot hits "home" on the second cylindrical surface of the ferrule, together with a release of flange 80 finishes the installation. This enables the claw 98 to grasp the ferrule 128.

Thereupon, the lock may be manipulated so as to swing the retaining arm 116 over the tab 72. This prevents the latching frame 56 from moving and also the claw 98 is locked in place, closing off the entrance to the slot 58.

When it is desired to remove the unit 20, the reverse procedure is followed. The lock is manipulated so that the retaining arm 116 swings away from the locking tab 72, to the position shown in FIG. 4. FIG. 3 shows the retaining arm 116 locking the tab 72 in place. When the retaining arm 116 is moved to the position of FIG. 4, the unit may be unlatched merely by placing fingers on the flanges 80 and lifting the flanges up against the pressure of the springs 90. The lower frame 48 then pivots to the position shown in FIG. 2, from which the front slot 60 may be disengaged from the member 120 merely by pulling up and slightly to the rear.

The ferrule assembly is adapted to take up any axial space which may be left in the assembly by reason of manufacturing tolerances or the like. The assembly uses the tension of the spring washer 146 to ensure that take-up fitting is urged snugly against the ferrule 128. However, this fit is not tight enough to cause resistance to removal, but only to ensure that the installation is rattle-free and precise.

Preferably, the frame elements 30, 35 and 22 are made from a steel material, and preferably these are chrome plated for appearance. Likewise, the fasteners 28 are chrome-plated for the sake of appearance. A system has been described wherein the fasteners hold both the luggage rack component and the backrest component to the main frame 30, bolting them through common openings. Other means of fastening these units in place may be employed, of course. Accordingly, the height or configuration of the backrest and length and width of the luggage rack may be varied considerably with the configuration of these parts not affecting the shape and function of the main frame 30 and its associated parts.

The main frame 30 includes and is shown with a desired degree of narrowing or offset, but this may vary according to the application. The spring and locking tabs are shown using a roll pin passing through the pivot pin 86, and having the spring wound so as to engage the roll pin on one end and the spring to be engaged on the other end by the spring tab 76. Other configurations of springs may be used, but the described version is preferable in one embodiment inasmuch as in this embodiment, the pivot pin is a desired method of securing the latching frame 56 to the main frame 30.

One lock has been shown even though, of course, two locks may be provided. The lower part 48 of the main frame 30 is secured to a structural member which is secured to the ferrules 128, 128a. These ferrules 128, 128a are shown as having two or three different diameters, but both the main frame slot and the latching frame slot may fasten to the same diameter on the ferrule 128, 128a, in which case the axial extent of the ferrule would be longer, but it would have a single diameter for reception of these parts.

The two slots in the frame are at approximately right angles, but the frame may take on a somewhat different shape and the ferrules 128, 128a may not be exactly in line. Accordingly, in the claims, the expression "substantially at a right angle" or other words of like import have been used. However, the object is preferably to have the arrangement such that when the nose slot is engaged, the other slot permits arcuate movement into engagement, with both of the locking shanks 122 of the ferrules 128, 128a being approximately but necessarily horizontally aligned in use. The accessory has proven very successful in its ease of being placed in position of use and latched, or being removed very easily by a simple manipulation. Prior art devices required much manual dexterity and generally did not offer the combination of convenience and security for the latching and locking systems.

The latching frame, or part thereof, may conceivably be made from a wire form, with round or flat wire being used, although this construction would not necessarily afford the convenience of the plate construction used in making the latching frame.

It will thus be seen that the present invention provides a new and improved accessory mounting system having a number of advantages and characteristics, including those specifically pointed out and others which are inherent in the invention. It is anticipated that modifications and changes may be made to the forms of invention shown without departing from the spirit of the invention or the scope of the appended claims.

What is claimed is:

1. A system for mounting and removing an accessory from the rear portion of a motorcycle, said mounting system including a main frame with upper end portions suitable for receiving the accessories, said main frame having lower end portions each including a nose portion with a generally horizontally extending slot at one end adapted to fit snugly in relation to a first fitting received on a first structural part of a cycle and a bottom-opening second slot disposed at substantially a right angle with respect to said horizontally extending slot, said second slot being adapted to fit snugly on a second fitting received on a second structural part of said cycle, a pair of latching frames, said latching frames lying parallel to and closely adjacent said main frame, said latching frames being secured to said main frame by means permitting pivotal movement with respect to said main frame, and a latching claw on each of said latching frames at least partially closing off said bottom-opening slot in said closed position and being retractable to provide free access to said bottom opening slot in an open position, means to prevent undesired movement of said latching frames with respect to said main frame, and biasing means urging said latching frames to said closed position.

2. A system as defined in claim 1 wherein said latching frames include a flange extending at substantially a right angle to said latching frames, said flange engaging said lower portion of said main frame in said open position of said latching frame, thereby limiting opening movement of said latching frame.

3. A system as defined in claim 1 wherein said means to prevent undesired movement of said latching frames comprises tabs on said latching frames and a retaining arm engageable with said tab.

4. A system as defined in claim 3 wherein said retaining arms engage a portion of said latching frames in said closed position thereof and thereby limit the opening movement of said latching frames.

5. A system as defined in claim 1 wherein said means permitting pivotal movement of said latching frame comprises a pin and said biasing means include a spring surrounding said pin and engaging a portion of at least one of said latching frames.

6. A system as defined in claim 5 wherein one part of said spring engages a part that moves with said latching frame.

7. A system as defined in claim 1 wherein said latching frames include an elongated opening in each of said latching frames.

8. A system as defined in claim 1 wherein a thin, lubricous washer lies between said main frame and each of said latching frames.

9. A system as defined in claim 7 which includes a lock assembly therein, a said lock assembly includes a retaining arm on one portion thereof, said retaining arm swinging between a retracted position allowing free but limited movement of at least one of said latching frames and a locked position wherein said retaining arm engages a portion of one of said latching frames, preventing movement thereof.

10. A system as defined in claim 9 wherein, said retaining arm engages a tab lying perpendicular to the plane of said latching frame.

11. A system as defined in claim 1 wherein said accessory includes a back rest.

12. A system as defined in claim 1 wherein said accessory includes a luggage rack.

13. A system as defined in claim 1 wherein said accessory includes a back rest and a luggage rack.

14. A system as defined in claim 1 wherein said first and second fittings are ferrules having axially movable fasteners associated therewith.

15. A system as defined in claim 14 wherein said ferrules have at least two diameters for receiving said slots and said claws.

16. A system for mounting and removing an accessory from a motorcycle, said mounting system including a main frame with upper end portions suitable for receiving said accessory, said main frame having lower end portions each including a nose portion with a generally horizontally extending slot at one end adapted to fit snugly in relation to a first fitting received on a first structural part of a cycle and a bottom-opening second slot disposed at substantially a right angle with respect to said horizontally extending slot, said second slot being adapted to fit snugly on a second fitting received on a second structural part of said cycle, a pair of latching frames, at least one of said latching frames including an elongated opening therein, said latching frames lying parallel to and closely adjacent said main frame, said latching frames being secured to said main frame by pins for pivotal movement with respect to said main frame, a flange on each of said latching frames extending at substantially a right angle to said latching frames, said flanges being adapted to be grasped by the fingers of a user, and a pair of latching claws at least partially closing off said bottom-opening slots in the closed position thereof and being retractable to provide free access to said slots in the open position thereof, a lock assembly extending through at least one of said elongated openings, and spring means urging said latching frames to said closed positions.

17. A system as defined in claim 16 wherein said accessory includes a back rest.

18. A system defined in claim 16 wherein said accessory includes a luggage rack.

19. A system defined in claim 16 wherein said accessory includes a back rest and a luggage rack.

20. A system for mounting and removing an accessory from the rear portion of a motorcycle, said mounting system including a main frame with upper end portions suitable for receiving the accessory, said main frame having lower end portions each including a nose portion with a generally horizontally extending slot at one end adapted to fit snugly in relation to a first fitting received on a first structural part of a cycle and a bottom-opening second slot disposed at substantially a right angle with respect to said horizontally extending slot, said second slot being adapted to fit snugly on a second fitting received on a second structural part of said cycle, a pair of latching members, said latching members lying parallel to and closely adjacent said main frame, said latching members being secured to said main frame by means permitting pivotal movement with respect to said main frame, and a latching means on each of said latching members at least partially closing off said bottom-opening slot in said closed position and being retractable to provide free access to said bottom opening slot in an open position, means to prevent undesired movement of said latching members with respect to said main frame, and biasing means urging said latching members to said closed position.

\* \* \* \* \*